United States Patent
Gavazzi

[15] 3,659,344
[45] May 2, 1972

[54] METHOD OF MAKING A DENTAL PROSTHESIS

[72] Inventor: Leo Gavazzi, Via Italia 13, Biella, Italy
[22] Filed: Dec. 7, 1970
[21] Appl. No.: 95,780

[30] Foreign Application Priority Data

Dec. 15, 1969 Italy..................................54390 A/69

[52] U.S. Cl..................................................32/2
[51] Int. Cl..................................................A61c 13/00
[58] Field of Search.....................................32/2, 8

[56] References Cited

UNITED STATES PATENTS 3,226,826  1/1966  Town...........................................32/2

Primary Examiner—Robert Peshock
Attorney—Sughrue, Rothwell, Mion, Zinn & Macpeak

[57] ABSTRACT

A denture is formed by a rigid acrylic resin tooth-bearing support element and an underlying cushion element of soft thermoplastics material. The cushion element and the support element are interlocked by the process of the invention, which entails sticking irregularly shaped thermoplastics granules on the outer surface of the preformed cushion element, and then pressing the latter into the preformed support element, before the latter is polymerized. The subsequent application of heat melts the granules to form integral undercut appendages on the cushion element, and also polymerizes the acrylic resin, hardening the support element and thereby interlocking the two elements.

5 Claims, 5 Drawing Figures

PATENTED MAY 2 1972

3,659,344

INVENTOR
LEO GAVAZZI

BY Sughrue, Rothwell, Mion, Zinn & Macpeak

ATTORNEYS

METHOD OF MAKING A DENTAL PROSTHESIS

BACKGROUND OF THE INVENTION

1. Field of the Invention

This invention relates to the manufacture of a dental prosthesis, or, as it is commonly called, a denture, more particularly a denture of the type formed by a tooth support element of rigid resin, generally acrylic resin, and a cushion element of flexible resin attached to the underside of the support element. The purpose of the cushion element is to avoid bruises to the mucuse of the gums, and to assist secure and stable fitting of the denture in the wearer's mouth.

2. Description of the Prior Art

Italian Pat. No. 783,475 relates to a process for the manufacture of dentures of the above mentioned type, which consists in arranging the rigid element of acrylic resin in a mould, forming in the mould a space for the cushion element, filling this space with thermoplastic flexible resin and heating the mould so as to keep the thermoplastic resin in a molten state, while exerting simultaneously a pressure on the thermoplastic resin contained in the mould by injecting further molten resin of the same type from the outside, thereby forming the cushion element.

According to this process the rigid element of the denture in acrylic resin is placed in the mould in a soft state prior to polymerization, while the thermoplastic resin is used in a solid state, in prefabricated sheet or powder form, to fill the space obtained in the mould; in this way the heating of the mould produces the softening of the thermoplastic resin and the simultaneous polymerization of the acrylic resin.

It is therefore necessary to employ for the formation of the soft cushion element a flexible thermoplastic resin which has a melting temperature which is not greater than the polymerization temperature of the acrylic resin.

This latter process has, however, some practical disadvantages, due mainly to the difficulty of effecting a firm connection between the elements of the denture, especially having regard to the high pressure which the denture itself has to bear in use.

SUMMARY OF THE INVENTION

An object of this invention is to avoid such drawbacks by providing a process for the manufacture of dentures of the aforesaid type, which is both simple and economical and which produces dentures having two elements formed of different resins and interconnected in a strong and secure way, resistant to pressures to which the denture itself is subjected in use.

Another object of this invention is to provide a process which allows manufacture of dentures of the above mentioned type which are of long duration and comfortable in use.

More specifically, it is an object of the invention to provide a process for the manufacture of a denture of the aforesaid type, comprising the steps of: forming a cushion element of soft thermoplastic resin; separately pre-forming a tooth support element in acrylic resin in a soft state; sticking a number of small irregularly shaped granules of the same material as that forming the cushion element on that surface of the pre-formed cushion element which mates with the support element; pressing the two elements together, to cause the granules projecting from said surface of the cushion element to penetrate into the support element while the acrylic resin of the latter is still in a soft state, and subsequently heating the two elements and holding them together under pressure while the thermoplastic resin which forms both the cushion element and the granules melts, the granules forming integral appendages on the cushion element and the heat polymerizing the acrylic resin of the support element and rigidifying the latter, thereby incorporating said appendages, integral with the soft cushion element, in the resin of the rigid support element and interlocking the two elements.

The invention also comprehends a denture manufactured by the above process, comprising a soft pre-formed cushion element of thermoplastic material anchored to a rigid support of the denture teeth through integrally-formed appendages on the cushion element, of the same thermoplastic material as the latter, which project from one surface of the soft cushion element and penetrate into the rigid support element.

BRIEF DESCRIPTION OF THE DRAWINGS

Further characteristics and advantages of this invention will be apparent from the detailed description which follows, given by way of non-limiting example, with reference to the appended drawings, in which.

DESCRIPTION OF THE PREFERRED EMBODIMENT

Figure 3:
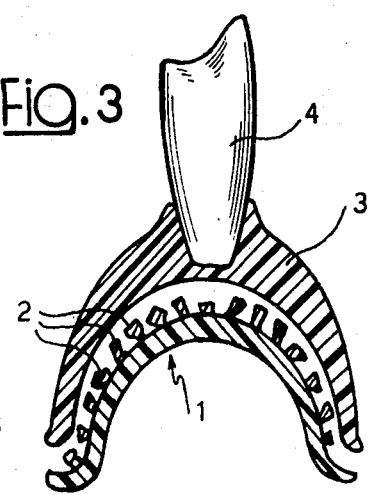
FIG. 3 is a transverse cross-section of the two elements of the denture in a third phase of the process, and FIGS. 4 and 5 similar to FIG. 3, illustrate respectively a further intermediate phase of the process.

In the drawings, numeral 1 indicates a soft cushion element of a denture of the type formed by two elements, namely a soft cushion element and a rigid tooth support element 3 (FIG. 3).

Figure 1:
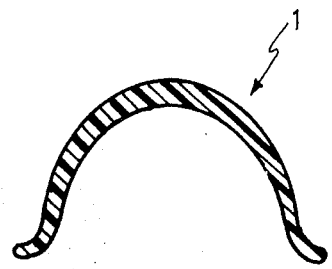
FIG. 1 is a diagrammatic transverse cross-section of one element of a denture, illustrated in a first phase of the process of manufacture according to this invention.

The cushion element 1 is pre-formed separately, for example, by a lost wax technique. According to this well-known technique, the cushion element 1 is prefabricated in thermoplastic flexible synthetic resin, by filling a mould first with wax and subsequently dissolving the wax in hot water; the space previously filled by the wax is then filled with molten thermoplastic resin to form the cushion element 1 (FIG. 1). The resin is injected under pressure by a piston-press of small diameter, of the type normally used for pressing thermoplastic resins.

The outer surface of the cushion element 1 is adapted to mate with the support element of the denture, by consecutively distributing on the said outer surface a larger number of small irregularly shaped particles, in this example small misshapen granules 2, whose maximum size does not exceed 0.5 mm. The granules 2 are obtained by grinding the same material as that from which the soft cushion element 1 is formed.

Figure 2:
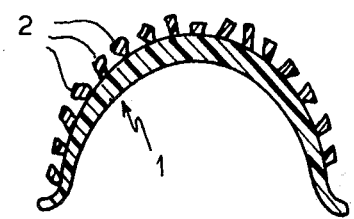
FIG. 2 is a transverse cross-section of the element illustrated in FIG. 1, in a second phase of the process.

The granules 2 are spread on the outer surface of the cushion element 1 after suitable adhesive has been applied to said surface. The granules 2 remain attached to the flexible cushion element 1 and can be applied to the element 1 in the desired quantity and at the most suitable positions on the outside surface of the latter, as illustrated in FIG. 2.

The cushion element 1 so prepared is inserted in one half of a mould (not shown) into which an acrylic resin which forms the support element 3 has previously been pressed, while still in a soft, pliable, or doughy state (see FIG. 3).

Figure 4:
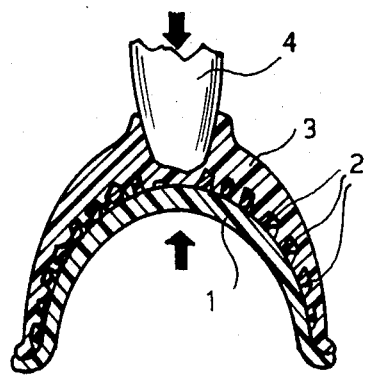

For example, the two elements 1, 3 of the denture may be pressed together in a screw press as illustrated in FIG. 4, so as to cause the penetration of the irregular granules 2 attached to the cushion element 1 into the still soft acrylic resin which forms the support element 3.

During this pressing phase the granules 2 remain attached to the flexible cushion element 1. Heat is then applied to the two elements 1 and 3 while the thermoplastic resin of the soft cushion element 1 is put under pressure by means of an injector or small diameter screw-piston.

Figure 5:
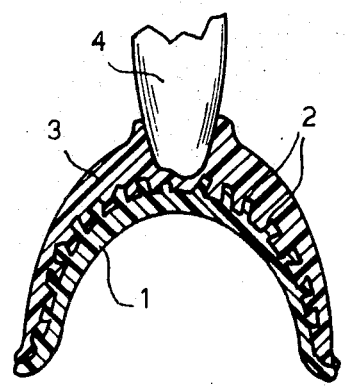

With the application of heat all the thermoplastic resin melts, including the granules 2 which are of the same material as the cushion element 1, while the acrylic resin of the support element 3 polymerizes, becoming completely rigid. As the granules 2 of thermoplastic resin are melted, they become integral with the flexible cushion element 1 (FIG. 5), forming in this way a number of undercut appendages which penetrate and which are locked in the rigid acrylic resin of the support element 5, interlocking the two elements 1 and 3.

It will be appreciated that details of specific embodiments of this invention can be widely varied from the embodiment which has been described and illustrated, without departing from the scope of this invention.

I claim:

1. A process for the manufacture of a denture of the type formed by a rigid tooth support element and a cushion element of soft plastics material permanently attached to the underside of the rigid support element, said process comprising the steps of:

preforming a cushion element of soft thermoplastic resin;

separately preforming a tooth support element in acrylic resin in a soft state;

providing a number of small irregularly shaped granules of the same material as that forming the cushion element on that surface of the preformed cushion element which mates with the support element;

pressing the two elements together, to cause the granules projecting from said surface of the cushion element to penetrate into the support element while the acrylic resin of the latter is still in a soft state;

heating the two elements and holding them together under pressure while the thermoplastic resin which forms both the cushion element and the granules melts, the granules forming integral appendages on the cushion element and the heat polymerizing the acrylic resin of the support element and rigidifying the latter, thereby incorporating said appendages, integral with the soft cushion element, in the resin of the rigid support element, and cooling the two elements to interlock them together.

2. A process as in claim 1, where the granules are adhesively applied to the cushion element.

3. A denture comprising a rigid tooth-carrying support base of a thermosetting plastic, and a soft cushion element of thermoplastic material having projecting appendages of the same thermoplastic material, the projecting appendages penetrating into the thermosetting plastic support base to form a permanent interlocking between the support base and the cushion element.

4. A denture as in claim 3, where the penetrating ends of the projecting appendages are larger than the ends attached to the cushion element, whereby the support base and the cushion element are permanently interlocked.

5. A denture as in claim 4, where the projecting appendages have a maximum thickness of 0.5 mm and the thermosetting plastic is an acrylic resin.

* * * * *